Jan. 3, 1956   M. D. REYNOLDS ET AL   2,729,115
ADJUSTABLE ACCELERATOR PEDAL DEPRESSING DEVICE
Filed Nov. 26, 1954
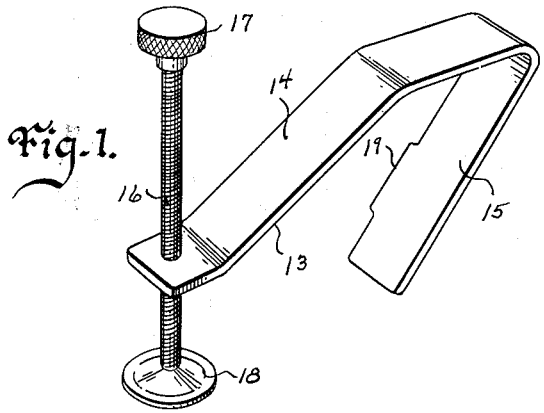
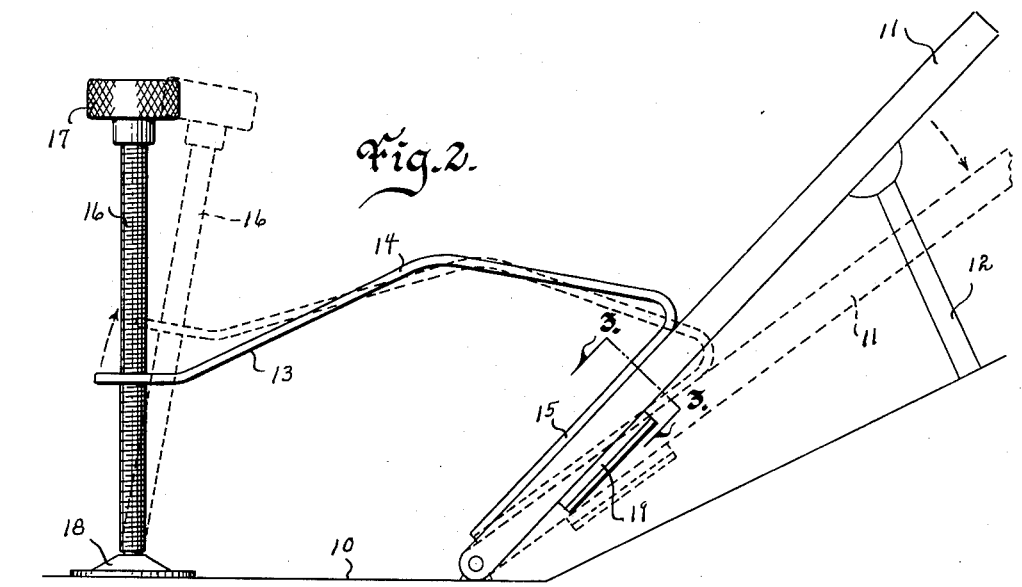
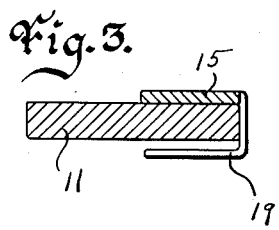
Inventors
Merle Dale Reynolds
& Park M. Griffith
by Talbert Dick & Adler
Attorneys
Witness
Edward P. Seeley

United States Patent Office 2,729,115
Patented Jan. 3, 1956

2,729,115

ADJUSTABLE ACCELERATOR PEDAL DEPRESSING DEVICE

Merle Dale Reynolds and Park M. Griffith, Mitchellville, Iowa

Application November 26, 1954, Serial No. 471,298

6 Claims. (Cl. 74—513)

This invention relates to automotive vehicles such as automobiles, trucks and like and more particularly to a means for holding their accelerator pedal in any desired depressed position of its movement.

Originally, cars and like were controlled by a hand throttle, usually mounted on or in connection with the steering wheel assembly. Later such vehicles adapted a carburetor foot feed and also had a hand push-pull throttle rod on the instrument board. However, today only the foot pedal accelerator remains in use. Such pedals are yieldingly held up and away from the floor board, or at idling motor speed not sufficient for travel. As is well known, when it is desired to use the internal combustion engine of the vehicle, the operator by use of his foot depresses the accelerator pedal accordingly. The amount of pedal depression is relative to the revolutions per minute of the engine inasmuch as the accelerator pedal is operatively connected to the engine carburetor. With the pressure relaxed or removed, the accelerator pedal moves upwardly and the engine slows down or returns to very low R. P. M. idling speed.

However, there are many instances when the vehicle is not moving and no one is in the driver's seat for both professional mechanics, and owners, to require the maintenance of the carburetor throttle above engine idling speed. This is particularly true during tune-up service. Also the throttle must be maintained open for a given selected R. P. M. Other needs for running the engine above idling speed are for recharging the battery, warming up the seating compartment of the vehicle during cold weather, and like. Regardless, however, of the need, about the only methods now in use with modern motor cars, are to have some one sit in the car and hold the accelerator pedal down, or place a brick on the pedal. Obviously, such procedures are not constant nor adjustably controllable.

Therefore, one of the principal objects of our invention is to provide a mechanical tool that will hold the accelerator pedal of an automotive vehicle in a predetermined depressed position.

A further object of this invention is to provide an accelerator pedal depressor that is easily and quickly adjustable as to its effect on the accelerator pedal.

A still further object of our invention is to provide a tool for holding an accelerator pedal in various positions of its movement, that will fit substantially all makes of automobiles and trucks in this hemisphere.

A still further object of this invention is to provide an accelerator pedal depressing unit that is easily and quickly installed or removed.

Still further objects of our invention are to provide an accelerator pedal depressor that is economical in manufacture and durable in use.

These and other objects will be apparent to those skilled in the art.

Our invention consists in the construction, arrangements, and combination, of the various parts of the device, whereby the objects contemplated are attained as hereinafter more fully set forth, specifically pointed out in our claims, and illustrated in the accompanying drawings, in which:

Fig. 1 is a perspective view of our tool ready for use.

Fig. 2 is an enlarged side view of our device, installed and adjustably depressing a vehicle accelerator pedal, and Fig. 3 is a cross sectional view of the device and a pedal and is taken on line 3—3 of Fig. 2.

In these drawings we have used the numeral 10 to generally designate the floor board of a vehicle. Hinged at its lower rear end is the usual accelerator pedal 11. As is well known, the under upper forward end portion of the pedal engages the carburetor throttle rod 12 which is spring loaded to yieldingly hold it in a rear position, and the pedal away from its swinging action toward the floor board. It is to such that we apply our adjustable tool, and which we will now describe in detail. The device is formed by taking a strap of sheet metal 13 and roughly forming it to first extend forwardly and then downwardly and rearwardly. This forward length is designated 14, and the downwardly and rearwardly extending portion by the numeral 15. The extreme rear end portion of the portion 14 is substantially horizontal, and the numeral 16 designates a threaded rod, threaded therethrough as shown in Fig. 1. A knurled head 17 is formed on the top of the rod 16 to facilitate its manual rotation. The numeral 18 designates a foot swiveled on the bottom of the rod 16 and adapted to engage the floor board 10. The numeral 19 designates a strap hook portion on the left edge of the portion 15. This hook 19 extends first forwardly and downward, and then to the right to assume a spaced relationship forward of the under side of the portion 15, as shown in Fig. 2.

To install our device it is merely necessary to place the same onto the left edge portion of the pedal, i. e., with the portion 15 extending down over the top of the pedal and the hook 19 passing along the side of the accelerator pedal, and thence under the pedal as shown in Fig. 3. Obviously, the height of the rear end of the strap 13 above the floor board at the rear of the pedal will determine the depressed position of the pedal. Therefore, by rotating the threaded rod, any position of the end of the strap 13, relative to the flood board may be had, and this in turn determines the depressed position of the accelerator pedal. Once the desired adjustment is obtained by the positioning of the threaded rod in the strap brace 13 the device may be removed or replaced without further adjustment. It is merely necessary to depress the pedal until the portion 15 and hook 19 may be slipped onto the pedal. After the device is so placed on the pedal and released the pedal will elevate until the foot 18 engages the floor board. Of course, any rotation of the knob 17 will change accordingly the position of the foot pedal 11.

This holding of the pedal in a predetermined adjustable position will be constant, accurate, positive and without variations.

Some changes may be made in the construction and arrangement of our adjustable accelerator pedal depressing device without departing from the real spirit and purpose of our invention, and it is our intention to cover by our claims, any modified forms of structure or use of mechanical equivalents which may be reasonably included within their scope.

We claim:

1. In combination, a floor board and spring loaded accelerator pedal of an internal combustion engine automotive vehicle; said pedal having its rear lower end hinged to the floor board and its length extending forwardly and upwardly, a bracket brace member extending first forwardly and then rearwardly and downwardly to detachably extend downwardly over the said pedal, and a hook portion on that part of said bracket brace member that extends rearwardly and downwardly extending detachably under the under side of said pedal; said brace bracket member having its rear end operatively supported by said floor board.

2. In combination, a floor board and spring loaded accelerator pedal of an internal combustion engine automotive vehicle; said pedal having its rear lower end hinged to the floor board and its length extending forwardly and upwardly, a bracket brace member extending first forwardly and then rearwardly and downwardly to detachably extend downwardly over the said pedal, a hook portion on that part of said bracket brace member that extends rearwardly and downwardly extending detachably under the under side of said pedal; and a threaded vertical rod threaded through the rear portion of said brace bracket member for regulating its height above said floor board.

3. In combination, a floor board and spring loaded accelerator pedal of an internal combustion engine automotive vehicle; said pedal having its rear lower end hinged to the floor board and its length extending forwardly and upwardly, a bracket brace member extending first forwardly and then rearwardly and downwardly to detachably extend downwardly over the said pedal, a hook portion on that part of said bracket brace member that extends rearwardly and downwardly extending detachably under the under side of said pedal; a threaded vertical rod threaded through the rear portion of said brace bracket member for regulating its height above said floor board, a means on the top of said threaded rod to facilitate its manual rotation, and a foot swiveled on the bottom of said threaded rod.

4. In an accelerator pedal depressing means, a brace member, a clamp portion on the forward end of said brace member adapted to engage the front and back of an accelerator pedal, and a threaded element threaded through the rear end portion of said brace member.

5. In an accelerator pedal depressing means, a brace member, a clamp portion on the forward end of said brace member adapted to detachably engage the front and back of an accelerator pedal, and a threaded element threaded through the rear end portion of said brace member.

6. In an accelerator pedal depressing means, a brace member, a clamp portion on the forward end of said brace member adapted to loosely engage the front and back of an accelerator pedal, and a threaded element threaded through the rear end portion of said brace member.

References Cited in the file of this patent

UNITED STATES PATENTS

| | | |
|---|---|---|
| 2,336,447 | Campbell | Dec. 7, 1943 |
| 2,553,448 | Frauen | May 15, 1951 |
| 2,597,379 | Romel | May 20, 1952 |